(12) United States Patent
Drexler

(10) Patent No.: US 9,869,337 B2
(45) Date of Patent: Jan. 16, 2018

(54) CERAMIC FASTENER

(71) Applicant: The Boeing Company, Chicago, IL (US)

(72) Inventor: Julie M. Drexler, Brier, WA (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 14/729,680

(22) Filed: Jun. 3, 2015

(65) Prior Publication Data

US 2016/0356299 A1 Dec. 8, 2016

(51) Int. Cl.
*F16B 35/04* (2006.01)
*F16B 33/00* (2006.01)

(52) U.S. Cl.
CPC .................. *F16B 33/006* (2013.01)

(58) Field of Classification Search
CPC ...... F16B 33/006; F16B 19/00; F16B 33/004; F16B 33/06; F16B 35/041
USPC ........................................................ 411/424
See application file for complete search history.

(56) References Cited

U.S. PATENT DOCUMENTS

| 4,414,011 A | 11/1983 | Layden | |
|---|---|---|---|
| 4,863,330 A * | 9/1989 | Olez | B29C 70/081 411/424 |
| 4,975,014 A * | 12/1990 | Rufin | F16B 35/00 403/30 |
| 5,127,783 A * | 7/1992 | Moghe | B29C 70/222 156/172 |
| 5,135,576 A * | 8/1992 | Johansen | C04B 28/02 106/638 |
| 5,399,052 A | 3/1995 | Volkmann | |
| 5,564,874 A * | 10/1996 | Agatonovic | C04B 35/80 411/417 |
| 5,728,445 A * | 3/1998 | Murakami | B32B 18/00 264/640 |
| 5,980,792 A * | 11/1999 | Chamlee | B22D 13/04 164/69.1 |
| 6,274,079 B1* | 8/2001 | Lindemann | B28B 1/008 264/328.2 |
| 2010/0119299 A1* | 5/2010 | Montminy | F16B 33/006 403/217 |
| 2010/0189529 A1* | 7/2010 | Steffier | F16B 3/00 411/368 |
| 2011/0005686 A1* | 1/2011 | Tanaka | H01L 21/68757 156/345.52 |
| 2011/0135915 A1* | 6/2011 | Lee | C23C 14/083 428/336 |
| 2014/0234052 A1* | 8/2014 | Blom | B29C 70/462 411/411 |

FOREIGN PATENT DOCUMENTS

| GB | 2283294 | 5/1995 |
|---|---|---|
| GB | 2437796 | 11/2007 |

OTHER PUBLICATIONS

European Search Report dated Oct. 27, 2016 in co-pending European Patent Application No. 16158131.9.

* cited by examiner

*Primary Examiner* — Gary Estremsky
(74) *Attorney, Agent, or Firm* — Joseph M. Rolnicki; Evans & Dixon, L.L.C.

(57) ABSTRACT

A ceramic fastener is constructed according to a method where the ceramic fastener has an outer shell of a strong ceramic material such as alumina or zirconia, and the outer shell has an interior bore filled with a glass-ceramic material.

20 Claims, 6 Drawing Sheets

CERAMIC FASTENER

FIELD

This disclosure pertains to the construction of a ceramic fastener. More specifically, this disclosure pertains to a method of constructing a ceramic fastener and the ceramic fastener constructed according to the method, where the ceramic fastener has an outer shell of a strong ceramic material such as alumina or zirconia, and the outer shell has an interior bore filled with a glass-ceramic material.

BACKGROUND

There are currently available ceramic fasteners constructed from alumina and ceramic fasteners constructed from zirconia based ceramic. However, currently known ceramic fasteners are considered by many to be poor in performance due to their low fracture toughness and impact resistance. There is a need in both commercial applications and in aeronautical applications for high temperature ceramic fasteners as well as non-conductive ceramic fasteners that have increased toughness and can withstand high impact and shear forces.

SUMMARY

A ceramic fastener of this disclosure is basically comprised of an exterior shell and an interior core constructed of different ceramic materials. The shell forms the exterior of the fastener and surrounds the core.

The shell has a cylindrical length with an interior bore. The interior bore extends through the shell between a first end of the interior bore and a second end of the interior bore. The shell has a head at a first end of the shell. The head extends over and around the first end of the interior bore. The head is configured as a head of a typical fastener, such as a hex head on a bolt or a slotted head on a machine screw. The shell has a shank that extends from the head to a second end of the shell. The shank surrounds the length of the interior bore. The shank is formed as one monolithic piece with the head. The shank has at least one external screw thread on the shank. The ceramic material of the shell is a high purity ceramic material such as sintered alumina or zirconia based ceramic.

The core is inside the interior bore of the shell. The core has a length that extends from a first end of the core at the first end of the interior bore to a second end of the core at the second end of the interior bore. The core is constructed of a glass-ceramic material. The glass-ceramic material is bonded to the interior surface of the interior bore of the shell during construction of the fastener and pulls the shell in compression.

In constructing the ceramic fastener, the shell is cast in a mold where the mold has an interior surface that forms the exterior surface of the shell. The shell is formed from a ceramic powder such as alumina or zirconia. The shell is formed in the mold by slip casting or injection molding, by isostatic pressing and sintering, or by another equivalent method. This forms the shell with the head configured for engagement by a tool conventionally used to turn fasteners and a shank extending from the head to the second end of the shell. The shank is molded with the at least one external screw thread on the exterior of the shank. The molding process also forms the shell with an interior bore that extends through the shell from the interior of the head, through the shank and to the second end of the shell. An opening to the interior bore is provided at the second end of the shell.

The core is then formed in the interior bore of the shell. The core is made up of ceramic powders that create a pre-glass-ceramic mixture. The pre-glass-ceramic mixture is then melted in a furnace. The melted glass-ceramic mixture is then poured into the interior bore of the shell. The melted pre-glass-ceramic mixture fills the interior bore of the shell from the interior of the shell head, through the shank and to the opening at the second end of the shell.

The shell and the glass-ceramic in the shell interior bore are then heat treated to crystallize the glass-ceramic of the core. This forms the glass-ceramic core of the fastener that bonds to the shell and pulls the shell in compression.

The fastener is then allowed to cool and the second end of the shell is machined to smooth the second end of the shell and the glass-ceramic at the second end of the shell and create the final ceramic fastener.

The features, functions and advantages that have been discussed can be achieved independently in various embodiments or may be combined in yet other embodiments, further details of which can be seen with reference to the following description and drawings.

DESCRIPTION

Figure 1:
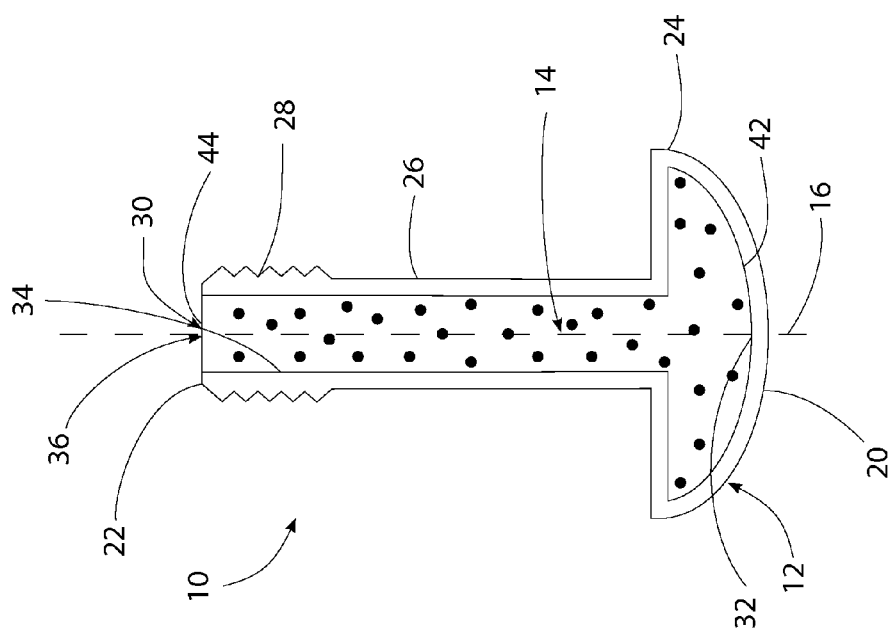
FIG. 1 is a representation of a cross-section view of the ceramic fastener of this disclosure.

FIG. 1 is a representation of a cross-section view of the ceramic fastener 10 of this disclosure. The fastener 10 is basically constructed of an exterior shell 12 and an interior core 14. The shell 12 and core 14 are formed of different ceramic materials. The shell 12 forms the exterior of the fastener 10 and surrounds the core 14. The fastener 10 has a center axis 16 and both the shell 12 and the core 14 are symmetric around the center axis 16.

The shell 12 has a cylindrical length between a first end 20 of the shell and a second end 22 of the shell. The shell 12 has a head 24 formed at the first end 20 of the shell. The exterior of the head 24 is configured as a head of a conventional fastener, such as a hex head on a bolt, a slotted head on a machine screw, or any other configuration of a conventional fastener head. The shell 12 also has a shank 26 that extends from the head 24 along the length of the shell 12 to the shell second end 22. The exterior surface of the shank 26 is configured as an exterior surface of a typical threaded fastener. As represented in FIG. 1, at least one external screw thread 28 is formed on the exterior of the shank 26 adjacent the shell second end 22. The shank 26 is formed as one monolithic piece with the head 24 and extends from the head 24 along the length of the shell 12 to the second end 22 of the shell. For this disclosure, the shell 12 is formed of a high purity ceramic material such as sintered alumina or zirconia based ceramic. Other equivalent ceramic materials could be employed. The shell 12 has an interior bore 30 that extends through the length of the shell 12. The interior bore 30 has a first end defined by a first interior surface 32 of the shell 12 inside the shell head 24. The interior bore 30 extends through the shell 12 from the first end of the bore defined by the first interior surface 32, through the length of the shank 26 where the bore 30 is defined by a second interior surface 34 of the shell 12, to a second end of the bore 30 defined by an opening 36 to the bore at the shell second end 22. The second portion 34 of the interior bore 30 that extends through the shank 26 has a cylindrical configuration with a constant interior diameter and a constant cross-section area. As can be seen in the representation of FIG. 1, the first portion 32 of the interior bore 30 defined by the first interior surface 32 in the shell head 24 also has a general cylindrical configuration with a cross-section diameter and cross-section area that is larger than the cross-section diameter and cross-section area of the second portion of the bore contained in the second interior surface 34 of the shank 26.

The core 14 is inside the interior bore 30 of the shell 12 and completely fills the interior bore. The core 14 has a length that extends from a first end 42 of the core that corresponds with the first interior surface 32 of the shell 12, to a second end 44 of the core that corresponds to the opening 36 of the interior bore at the shell second end 22. Along the length of the core 14, the core has an exterior surface that corresponds with the first interior surface portion 32 and the second interior surface portion 34 of the bore 30. This forms a head on the core 14 in the first interior surface portion 32 of the bore 30 and forms a shank on the core 14 in the second interior surface portion 34 of the bore 30. The core 14 is constructed of a glass-ceramic material. The glass-ceramic material is bonded to the first interior surface portion 32 and the second interior surface portion 34 of the bore 30 in the shell 12. This bond is created during the construction of the fastener 10 and results in the core 14 pulling the shell 12 in compression.

The method of constructing the ceramic fastener 10 is represented in FIGS. 2-6. In constructing the ceramic fastener 10, the shell 12 is first formed and then the core 14 is formed in the shell.

Figure 6:
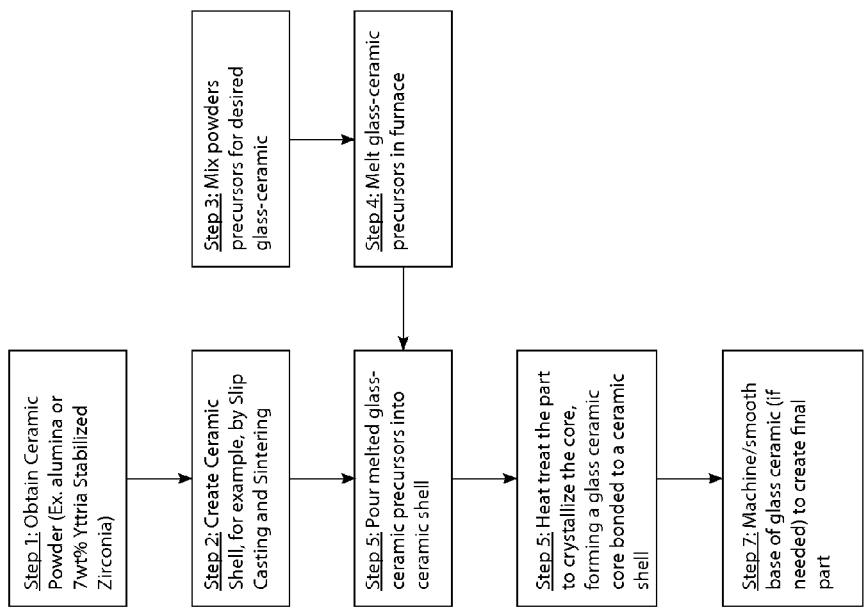
FIG. 6 is a flowchart of the method of forming the ceramic fastener.

Referring to FIG. 6, step 1, a ceramic powder to be used to form the shell 12 is determined. For this disclosure, the ceramic powder is alumina. However, zirconia or other equivalent ceramic powders could be used.

Figure 2:
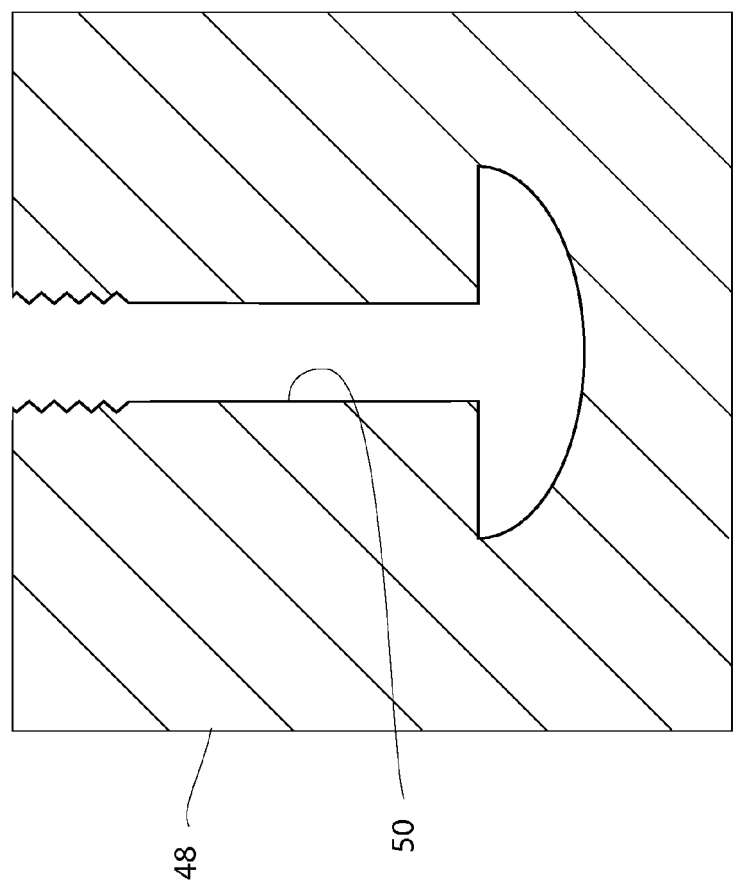
FIG. 2 is a representation of a mold used in forming the shell of the fastener.
Figure 3:
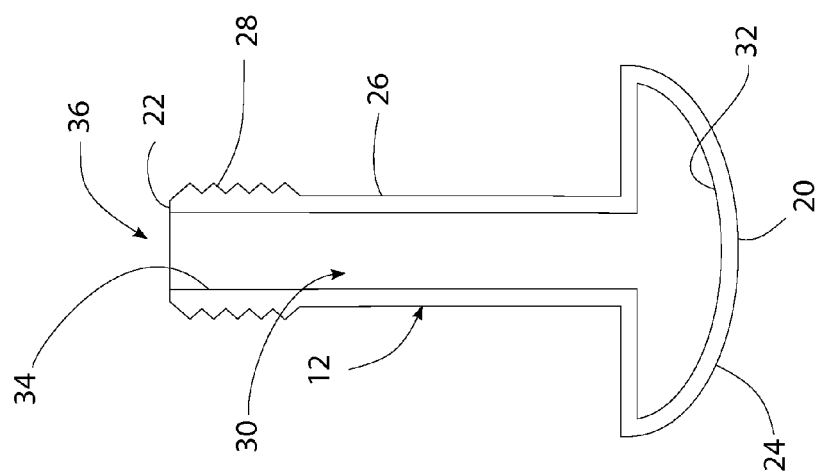
FIG. 3 is a representation of a cross-section view of the shell removed from the mold.

Referring to FIG. 2 and FIG. 6, step 2, the shell 12 is formed in a mold 48 that has an interior surface 50 configured to form the exterior surface of the shell 12. FIG. 2 represents only one half of the mold 48. It should be understood that a second half of the mold that is a mirror image of the half of the mold 48 shown in FIG. 2 is also used in forming the shell 12. The shell 12 is formed in the two halves of the mold 48 from the alumina ceramic powder by slip casting, by hot isostatic pressing and sintering, or by another equivalent method. On completion of the molding of the shell 12, the shell 12 is removed from the mold 48 as represented in FIG. 3. As represented in FIG. 3, the shell 12 is molded with the head 24 at the first end 20 of the shell, the shank 26 extending along the length of the shell 12 to the shell second end 22, the external screw threading 28 on the shank 26 and the internal bore 30 extending from the first end 32 of the internal bore through the shell 12 to the second end 34 of the bore at the opening 36 at the shell second end 22.

As represented in FIG. 6, step 3, ceramic powders are determined as pre-cursors for the desired glass-ceramic material to form the core 14. The selected powders are mixed forming a pre-glass-ceramic mixture.

As represented in FIG. 6, step 4, the pre-glass-ceramic mixture is put into a crucible in a furnace and is heated in the furnace to melt the pre-glass-ceramic mixture to form melted pre-crystalline glass-ceramic.

Figure 4:
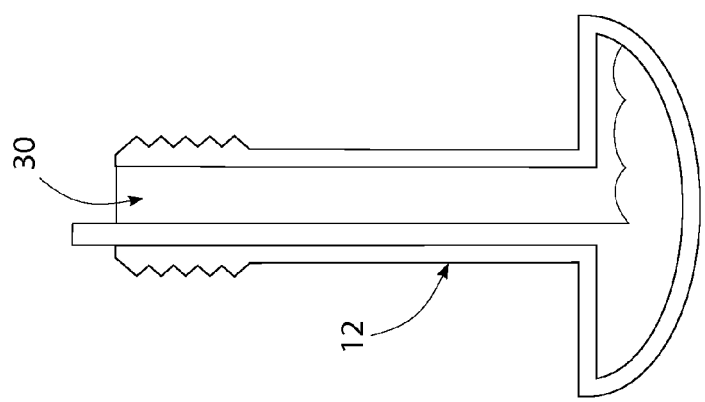
FIG. 4 is a representation of a cross-section view of the shell being filled with a hot, melted pre-glass-ceramic mixture.

As represented in FIG. 4 and FIG. 6, step 5, the melted pre-crystalline glass-ceramic is then poured from the crucible through the opening 36 in the shell second end 22 and into the interior bore 30 of the shell 12. The melted pre-crystalline glass-ceramic completely fills the interior bore 30 of the shell 12 to the opening 36 of the interior bore 30.

Figure 5:
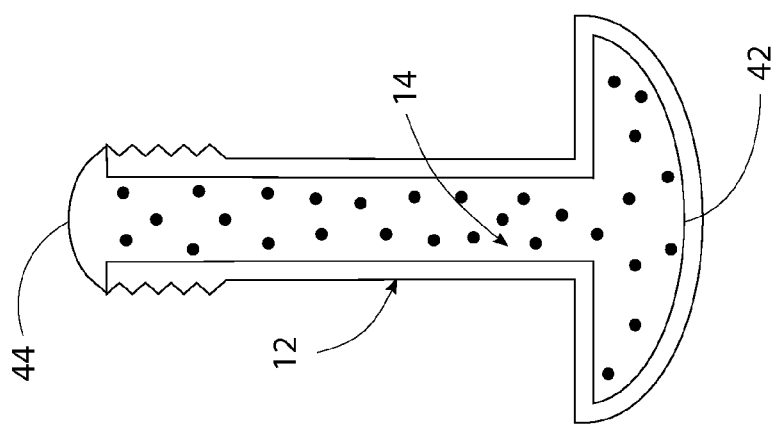
FIG. 5 is a representation of a cross-section view of the shell filled with the glass-ceramic mixture where the glass-ceramic mixture has been heated and gone through crystallization to form the glass-ceramic core of the fastener.

As represented in FIG. 5 and FIG. 6, step 6, the melted pre-crystalline glass-ceramic in the interior bore 30 of the shell 12 and the shell are heat treated to crystallize the glass-ceramic of the core 14. This forms the glass-ceramic core 14 bonded to the first interior surface portion 32 and the second interior surface portion 34 of the bore 30 in the shell 12 and pulls the shell 12 in compression toward the core 14.

As represented in FIG. 6, step 7, the shell 12 and the core 14 of the ceramic fastener 10 are allowed to cool. Following cooling, the shell 12 and core 14 go through machining to smooth the shell second end 22 and the core 14 at the opening 36 of the shell interior bore 30, if needed, to create the final ceramic fastener represented in FIG. 1.

As various modifications could be made in the construction of the nacelle inlet and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A fastener comprising:
    a shell creating an exterior of the fastener, the shell having a cylindrical length with an interior bore, the interior bore extends through the shell between a first end of the interior bore and a second end of the interior bore, the shell having a head that extends over the first end of the interior bore, the shell having a shank that extends around the interior bore, the shank being one monolithic piece with the head and the shank extending from the head along the cylindrical length of the shell to the second end of the interior bore, the shell being constructed of ceramic material;
    a core inside the interior bore of the shell, the core having a length that extends from the first end of the interior bore to the second end of the interior bore, the core being constructed of glass-ceramic material;
    the interior bore of the shell being surrounded by an interior surface; and,
    the core having an exterior surface that extends around the core, the exterior surface of the core being bonded with the interior surface of the interior bore and pulling the shell in compression around the core.

2. The fastener of claim 1, further comprising:
    the shank having an external screw thread on the shank, the external screw thread extending around the core.

3. The fastener of claim 1, further comprising:
the ceramic material of the shell being a ceramic material other than glass-ceramic material.
4. The fastener of claim 1, further comprising:
the ceramic material of the shell being sintered alumina.
5. The fastener of claim 1, further comprising:
the head extending around the first end of the interior bore with the first end of the interior bore being inside the head;
the core having a first end and a second end at opposite ends of the length of the core, and the first end of the core being at the first end of the interior bore and being inside the head.
6. The fastener of claim 5, further comprising:
the core having a head at the first end of the core, the head of the core having a cross-sectional area that is a largest cross-sectional area of the length of the core, and the head of the core being inside the head of the shell.
7. The fastener of claim 1, further comprising:
the head of the shell being configured as a head of a fastener.
8. A fastener comprising:
a core having a length, the core having a first end and a second end at opposite ends of the length of the core, the core having an exterior surface that extends around the core, the core being constructed of a glass-ceramic material;
a shell around the core, the shell being constructed of a ceramic material that is not glass-ceramic, the shell having a head that extends around the first end of the core, the shell having a shank that extends around the length of the core, the shank being one monolithic piece with the head, the shank extending from the head along the length of the core to the second end of the core; and,
the shell being bonded with the exterior surface of the core and the core pulling the shell in compression around the core.
9. The fastener of claim 8, further comprising:
the ceramic material of the shell being sintered alumina.
10. The fastener of claim 8, further comprising:
the ceramic material of the shell being zirconia.
11. The fastener of claim 8, further comprising:
the core having a head at the first end of the core, the head of the core having a cross-sectional area that is a largest cross-sectional area of the length of the core, and the head of the core being inside the head of the shell.
12. The fastener of claim 8, further comprising:
the shank having an external screw thread on the shank, and the external screw thread extending around the core.
13. The fastener of claim 8, further comprising
the head of the shell being configured as a bolt hex head.
14. The fastener of claim 8, further comprising:
the head of the shell being configured as a screw slotted head.
15. A method of making a fastener comprising:
forming a shell of the fastener, the shell having a length with opposite first and second ends, forming a head on the first end of the shell, forming external screw threading on a second end of the shell, forming the shell with a interior bore extending through the length of the shell;
pouring melted pre-crystalline glass-ceramic into the interior bore of the shell;
heat treating the melted pre-crystalline glass-ceramic inside the interior bore of the shell and heat treating the shell, causing pre-crystalline glass-ceramic to crystallize to glass-ceramic and bond to the shell and pull the shell in compression to the glass-ceramic.
16. The method of claim 15, further comprising:
forming the shell of ceramic material.
17. The method of claim 15, further comprising:
forming the shell of alumina.
18. The method of claim 15, further comprising:
forming the shell of zirconia.
19. The method of claim 15, further comprising:
forming the shell by one of slip casting or injection molding, followed by isostatic pressing and sintering a ceramic material to form the shell.
20. The method of claim 15, further comprising:
machining the second end of the shell and the glass-ceramic bonded to the shell to form a smooth base.

* * * * *